W. G. HINTZ & W. E. ALTHOUSE.
WINDOW VENTILATOR.
APPLICATION FILED DEC. 10, 1908.
932,861.
Patented Aug. 31, 1909.
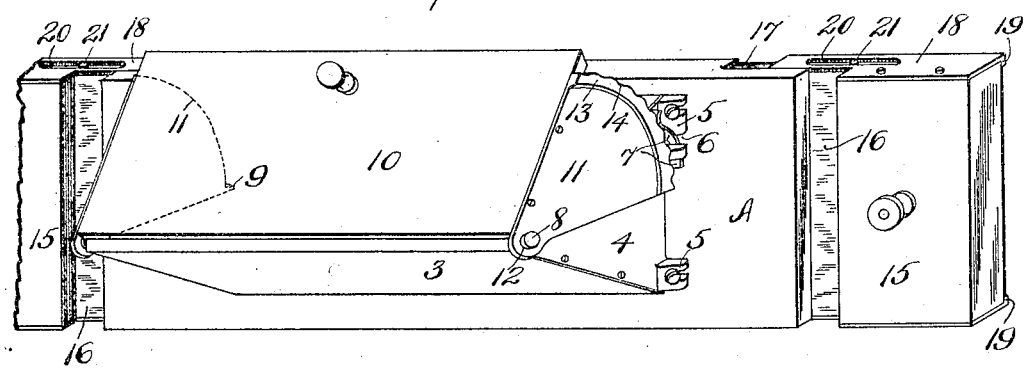
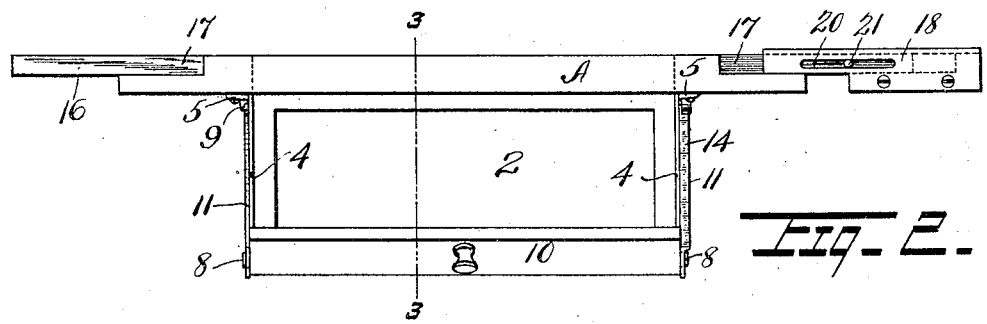
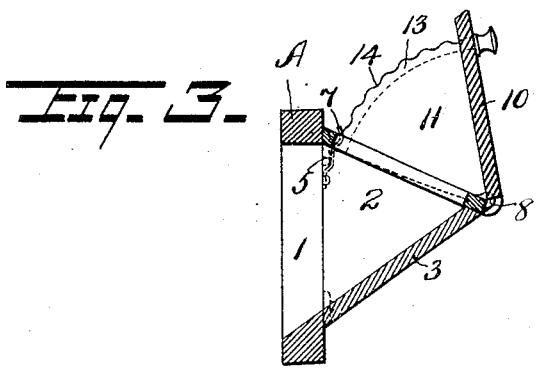
William G. Hintz
William E. Althouse
Inventors
Witnesses
By
Attorney

UNITED STATES PATENT OFFICE.

WILLIAM G. HINTZ AND WILLIAM E. ALTHOUSE, OF READING, PENNSYLVANIA.

WINDOW-VENTILATOR.

932,861.

Specification of Letters Patent. Patented Aug. 31, 1909.

Application filed December 10, 1908. Serial No. 466,755.

*To all whom it may concern:*

Be it known that we, WILLIAM G. HINTZ and WILLIAM E. ALTHOUSE, both citizens of the city of Reading, in the county of Berks and State of Pennsylvania, have invented certain new and useful Improvements in Window-Ventilators, of which the following is a specification.

Our invention relates to window ventilators and consists in certain improvements in construction hereinafter fully described in connection with the accompanying drawings and specifically pointed out in the claim.

Figure 1 is a perspective view of a ventilator embodying our improvements. Fig. 2 is a plan view of the same. Fig. 3 is a cross-section on the line 3—3 of Fig. 2.

A represents the partition board or plate, having an air-inlet aperture 1 communicating with an open-top interior hood or box 2, which is formed as shown by an inclined wall 3 and separately formed triangular end-walls 4. These end-walls are formed with bolting lugs 5 having screw-openings to secure the same to the partition plate A; and one of said lugs is provided with a slot 6 adapted to engage one end of a spring-metal detent 7, so as to permit of the latter being secured to the plate A in the act of screwing the lugged end-wall thereto; the function of said detent being hereafter referred to. A trunnion 8 is also provided on each wall plate upon which to pivot the box-lid. This hinged lid comprises a cover plate 10 for the open top of the box 2, and segmental end-pieces 11 secured to the side edges thereof so as to lie close to the end-walls 4 of the box when the lid is closed down. These segmental end-pieces have apertures 12 in which the trunnions 8 are entered so as to hinge the lid to the box; and the curved rim 13 of one of them is provided with notches 14 adapted to be engaged by the free end of the spring detent 7 already referred to, so as to be held by the latter in easily adjusted open position as desired; while the curved rim of the other is provided with a projecting stop 9 adapted to strike against the adjacent lug 5 when the lid is raised to approximately vertical position. When thus raised, or in any intermediate position, the segmental end-pieces 11 serve as upward extensions of the fixed end-walls 4 of the box, whereby the air admitted through the aperture 1, is compelled to rise vertically in passing into the room, while at the same time the rims serve to support and limit the opening of the lid as stated.

To provide for adjusting the length of the partition plate A as is practically desirable, we employ a sliding extension 15 so connected as to be always maintained in alinement with said plate as indicated. For this purpose one or both ends of the plate A are rabbeted vertically as shown at 16, to receive the overlapping correspondingly rabbeted sliding extension 15; and is also rabbeted horizontally as indicated at 17, 17, to receive the guide plates 18, 18 which are secured to the top and bottom edges of the extension 15. These guide plates of the sliding extensions thus lie flush with the top and bottom edges of the plate A; and they are each formed with a longitudinal flange 19 overlapping the latter, and with a slot 20 which engages a pin 21 on the plate, so that in sliding the extension 15 upon the rabbeted end of the plate A to vary the length of the latter, the extension will at all times be maintained in the same plane and in direct alinement with the plate itself by the special connection described.

What we claim is:—

A ventilator comprising an apertured partition plate, an open-top box communicating with said aperture and having separate triangular-shaped end-walls each provided with a pivoting trunnion and bolting lugs, one of which latter has a detent-engaging slot; a cover plate having separately formed segmental ends each of which is provided with a pivot aperture engaged upon one of said trunnions and one of which is also formed with a stop-projection and with a notched rim, and a spring detent secured by said slotted bolting lug and adapted to engage said rim.

In testimony whereof, we affix our signatures, in the presence of two witnesses

WILLIAM G. HINTZ.
WILLIAM E. ALTHOUSE.

Witnesses:
D. M. STEWART,
W. G. STEWART.